United States Patent [19]

Okudaira

[11] 4,251,132
[45] Feb. 17, 1981

[54] COMPACT STANDARD ZOOM LENS
[75] Inventor: Sadao Okudaira, Banzan, Japan
[73] Assignee: Asahi Kogaku Kogyo Kabushiki Kaisha, Tokyo, Japan
[21] Appl. No.: 45,353
[22] Filed: Jun. 4, 1979
[30] Foreign Application Priority Data
Jun. 30, 1978 [JP] Japan .................. 53-79378
[51] Int. Cl.³ .......................... G02B 15/14
[52] U.S. Cl. .......................... 350/423
[58] Field of Search ........................ 350/184
[56] References Cited
U.S. PATENT DOCUMENTS
4,198,128  4/1980  Ogino .................. 350/184

*Primary Examiner*—Conrad J. Clark
*Attorney, Agent, or Firm*—Sughrue, Rothwell, Mion, Zinn and Macpeak

[57] ABSTRACT

A compact standard zoom lens having a high performance, composed, in order from the object side, of a front lens group being a divergent lens group and a rear lens group being a convergent lens group. Both lens groups are mechanically movable to vary the focal length. The divergent lens group is composed, in order from the object side, of a first positive lens, a second double concave negative lens and a third positive meniscus lens convex on the object side. The convergent lens group is composed of less than five positive lenses and one negative lens. The zoom lens satisfies the following conditions:

$$0.7|r_3| < |r_2| < 0.95|r_3|r_2, r_3 < 0 \quad (1)$$

$$n_2 > 1.80 \quad (2)$$

$$d_1 + d_2 + d_3 + d_4 + d_5 < 0.45\ F_s \quad (3)$$

$$0.6 < r_4/r_5 < 1.0, \quad (4)$$

where:
- $F_s$ is the minimum focal length of the overall zoom lens,
- $n_i$ is the refractive index of the i-th lens at d-line,
- $\nu_i$ is the Abbe number of the i-th lens,
- $r_j$ is the radius of curvature of the j-th surface, and $d_k$ is the k-th lens thickness or lens distance.

2 Claims, 8 Drawing Figures

COMPACT STANDARD ZOOM LENS

BACKGROUND OF THE INVENTION

The present invention relates to a relatively large numerical aperture and extremely compact zoom lens characterized in a construction of a front lens group thereof, which includes a standard lens view angle in a photographic lens having a covering angle of about 45° and a covering angle of which reaches about 56° at the wide angle end.

A two-lens group type zoom lens of standard size including a standard view angle is well known. In order to miniaturize the lens system it is an important technique to reduce the number of constructive lenses of the overall lens system, particularly in the front lens group having a large effective lens diameter. On the other hand, it is very difficult to reduce the number of constructive lenses in a zoom lens, having a covering angle of about 56° at its wide angle end and a large F-number of about 1:2.8 to 1:3.5 as in the present invention and at the same time achieve satisfactory aberration compensation.

For example, published unexamined Japanese Patent Application No. 51-83543 discloses a relatively large numerical aperture zoom lens system where a front lens group thereof is composed of three lenses which are arranged, in order from the object side, a negative meniscus lens, a double concave negative lens and a positive lens. The number of the lenses in the front lens group of the prior art is the same as that of the present invention. However, in this prior art lens, since a first negative lens is a negative meniscus lens convex toward the object side the distance between the first and second lenses becomes large. This leads to the difficulty of compactness.

SUMMARY OF THE INVENTION

Accordingly, it is an object of this invention to provide a zoom lens of compact construction.

It is another object of this invention to provide a zoom lens having satisfactory aberration compensation yet with a minimum number of constructive lens.

A further object of this invention is to provide an extremely compact zoom lens having super performance.

In the present invention, the front lens group is a three group-three lens element type, that is composed, from the object side, of a positive lens, a double concave negative lens and a positive meniscus lens convex on the object side to thereby obtain an extremely compact zoom lens having a high performance. The rear lens group is a convergent lens group composed of less than five positive lenses and one negative lens. The zoom lens satisfy the following conditions:

$$0.7|r_3| < |r_2| < 0.95|r_3|r_2, r_3 < 0 \quad (1)$$

$$n_2 > 1.80 \quad (2)$$

$$d_1 + d_2 + d_3 + d_4 + d_5 < 0.45 F_s \quad (3)$$

$$0.6 < r_4/r_5 < 1.0 \quad (4)$$

where:
Fs is the minimum focal length of the overall zoom lens,
$n_i$ is the refractive index of the i-th lens at d-line,
$v_i$ is the Abbe number of the i-th lens,
$r_j$ is the radius of curvature of the j-th surface, and
$d_k$ is the k-th lens thickness of lens distance.

This invention will be described with respect to the drawings and the description of the preferred embodiment that follows.

DESCRIPTION OF THE PREFERRED EMBODIMENTS

Figure 1:
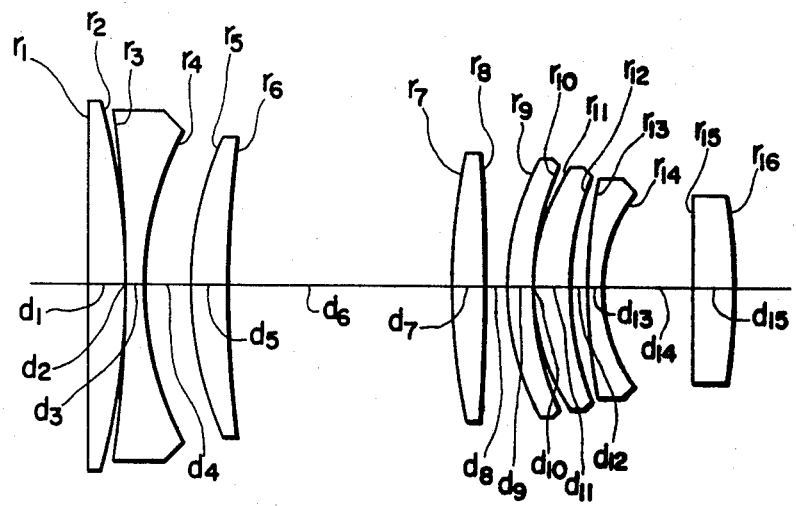
FIG. 1 shows a lens construction of the zoom lens system of the first embodiment according to the present invention.

The specific lens construction of the present invention will be hereinafter described. The overall lens system is divided into two lens groups, a front lens group and a rear lens group. In order from the object side, the front lens group is divergent and the rear lens group is convergent. Both lens groups are mechanically moved to vary the focal length. The divergent lens group is composed, in order from the object side, of a first positive lens, a second double concave negative lens and a third positive meniscus lens convex on the object side. The front lens is therefore composed of the three lenses. The convergent lens group is composed of less than five positive lenses and one negative lens. The lens system according to the present invention is a compact standard zoom lens and satisfies the following conditions:

$$0.7|r_3| < |r_2| < 0.95|r_3|r_2, r_3 < 0 \quad (1)$$

$$n_2 > 1.80 \quad (2)$$

$$d_1 + d_2 + d_3 + d_4 + d_5 < 0.45 \ Fs \quad (3)$$

$$0.6 < r_4/r_5 < 1.0 \quad (4)$$

where:
Fs is the minimum focal length of the overall zoom lens,
$n_i$ is the refractive index of the i-th lens at d-line,
$v_i$ is the Abbe number of the i-th lens,
$r_j$ is the radius of curvature of the j-th surface, and
$d_k$ is the i-th lens thickness of lens distance.

Each condition for the present invention will be hereinafter described.

Condition (1) is required primarily for compensation of negative distortion aberration at the wide angle end. When $|r_2|$ exceeds $0.95 \ |r_3|$, the negative distortion aberration increases. Inversely, when $|r_2|$ is smaller than $0.7 \ |r_3|$, through available to compensate for the distortion aberration, the lens power of the first lens becomes large or the radius of curvature of the first surface becomes strong concave on the object side. This leads to deterioration of the other aberrations. Therefore, the compensation of the negative distortion aberration at the wide angle end can be achieved by creating an appropriate difference between $|r_2|$ and $|r_3|$.

Condition (2) is required to provide a front lens group which is composed of two positive lenses and one negative lens, that is, three lenses and is totally formed into a divergent lens group. If $n_2$ of the second negative double concave lens is smaller than 1.8, $r_3$ and $r_4$ become extreme. As a result, compensation for spherical aberration and a comatic aberration is difficult.

Condition (3) is related to compactness of the zoom lens. If $d_1+d_2+d_3+d_4+d_5$ is greater than 0.45 Fs, though available to compensate for various aberrations, the overall length of the zoom lens and the lens diameter of the front lens group increases. This has a detrimental effect on efforts to achieve compactness or miniaturization of the lens system.

Condition (4) is required to compensate for spherical aberration in a large numerical aperture lens system. A large amount of the third order spherical aberration generated in the surface $r_4$ is almost completely compensated for by the surface $r_5$. Hence, when $r_4/r_5$ becomes greater than 1, the spherical aberration is not adequately compensated. Inversely, when $r_4/r_5$ becomes smaller than 0.6, the compensation thereof is excessive.

The Examples of the invention will now be described.

Figure 2:
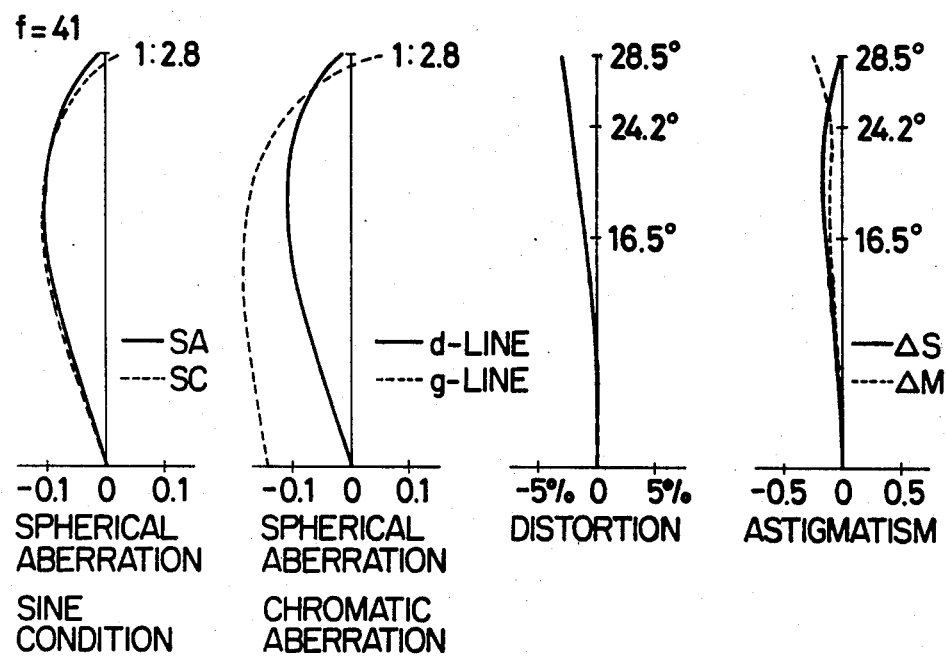
FIGS. 2, 3 and 4 show various aberration graphs at minimum, middle and maximum focal lengths of the first embodiment of the zoom lens according to the present invention, respectively.
Figure 3:
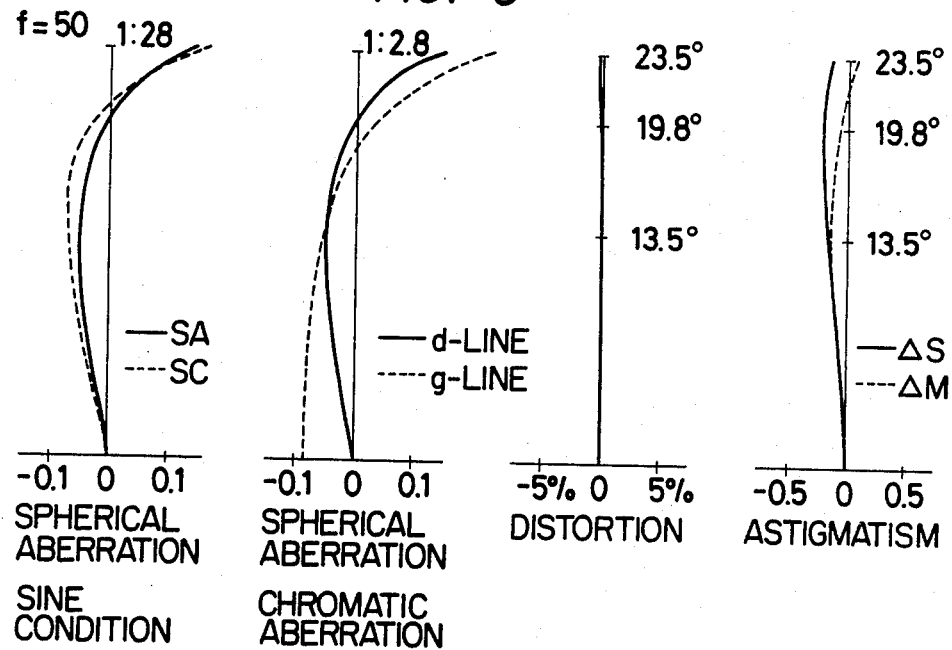
Figure 4:
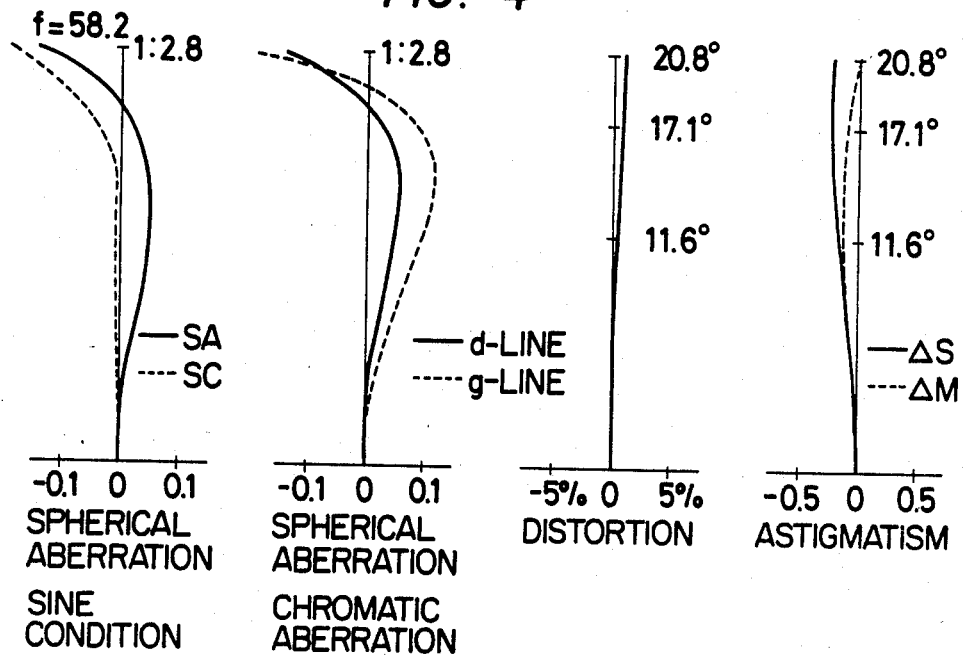

Referring first to FIGS. 1-4 a first embodiment of the invention is shown. The following chart provides data for this embodiment.

| FIRST EMBODIMENT Focal Length: F = 41 ~ 58.2 | | | |
|---|---|---|---|
| Radius of Curvature | Lens Thickness | Refractive Index | Abbe Number |
| $r_1$ = 1430.844 | $d_1$ = 3.42 | $n_1$ = 1.68250 | $\nu_1$ = 44.7 |
| $r_2$ = −78.000 | $d_2$ = 0.18 | | |
| $r_3$ = −90.880 | $d_3$ = 1.46 | $n_2$ = 1.83481 | $\nu_2$ = 42.7 |
| $r_4$ = 27.915 | $d_4$ = 4.91 | | |
| $r_5$ = 33.881 | $d_5$ = 3.48 | $n_3$ = 1.69895 | $\nu_3$ = 30.1 |
| $r_6$ = 107.950 | $d_6$ = 21.78 ~ 1.33 (variable) | | |
| $r_7$ = 57.855 | $d_7$ = 3.23 | $n_4$ = 1.81600 | $\nu_4$ = 46.6 |
| $r_8$ = −212.500 | $d_8$ = 2.11 | | |
| $r_9$ = 23.205 | $d_9$ = 2.84 | $n_5$ = 1.81554 | $\nu_5$ = 44.4 |
| $r_{10}$ = 34.500 | $d_{10}$ = 0.10 | | |
| $r_{11}$ = 19.350 | $d_{11}$ = 3.54 | $n_6$ = 1.64000 | $\nu_6$ = 60.1 |
| $r_{12}$ = 38.667 | $d_{12}$ = 1.38 | | |
| $r_{13}$ = 60.350 | $d_{13}$ = 1.30 | $n_7$ = 1.84666 | $\nu_7$ = 23.9 |
| $r_{14}$ = 14.400 | $d_{14}$ = 8.84 | | |
| $r_{15}$ = −13639.246 | $d_{15}$ = 3.96 | $n_8$ = 1.88300 | $\nu_8$ 40.8 |
| $r_{16}$ = −56.177 | | | |

$d_1 + d_2 + d_3 + d_4 + d_5 = 13.45$
$r_4/r_5 = 0.8239$

Figure 5:
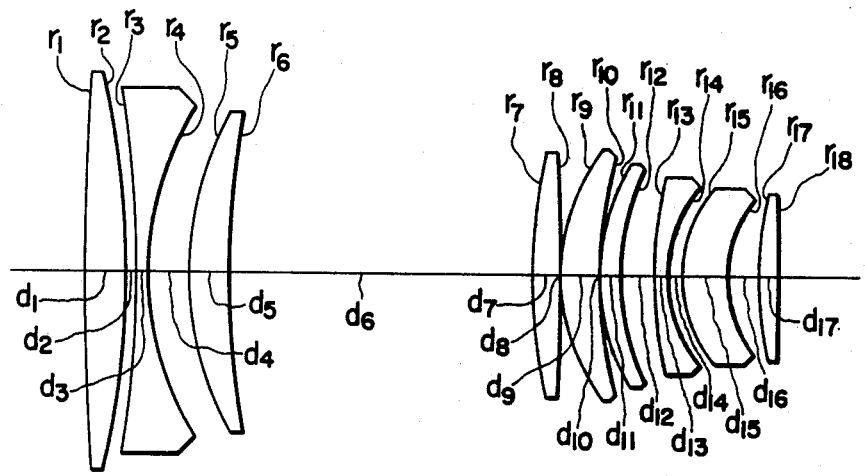
FIG. 5 shows a lens construction of a zoom lens system of the second embodiment according to the present invention.
Figure 6:
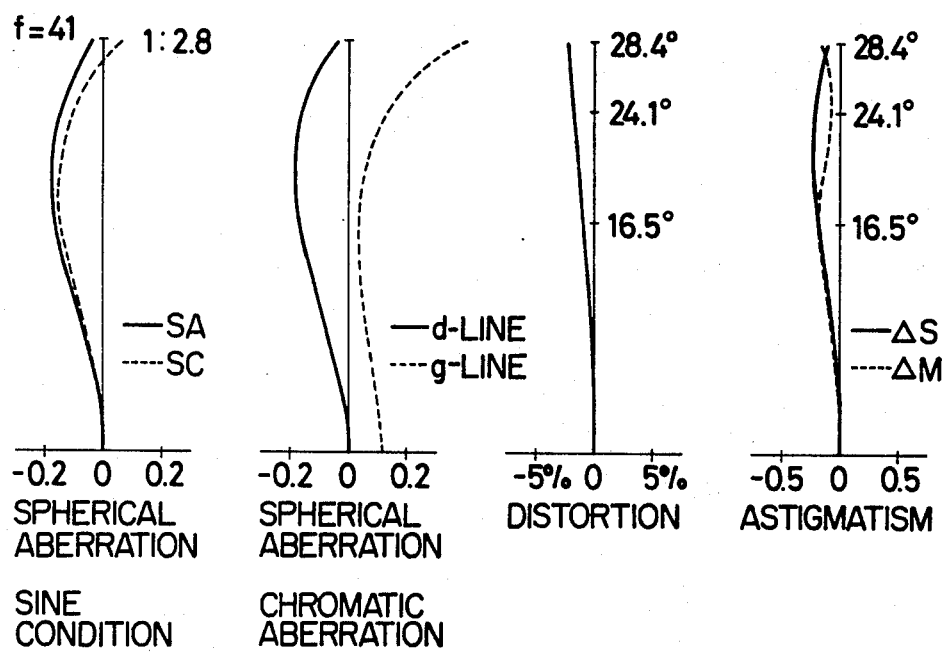
FIGS. 6, 7 and 8 show various aberration graphs at minimum, middle and maximum focal lengths of the second embodiment of the zoom lens according to the present invention, respectively.
Figure 7:
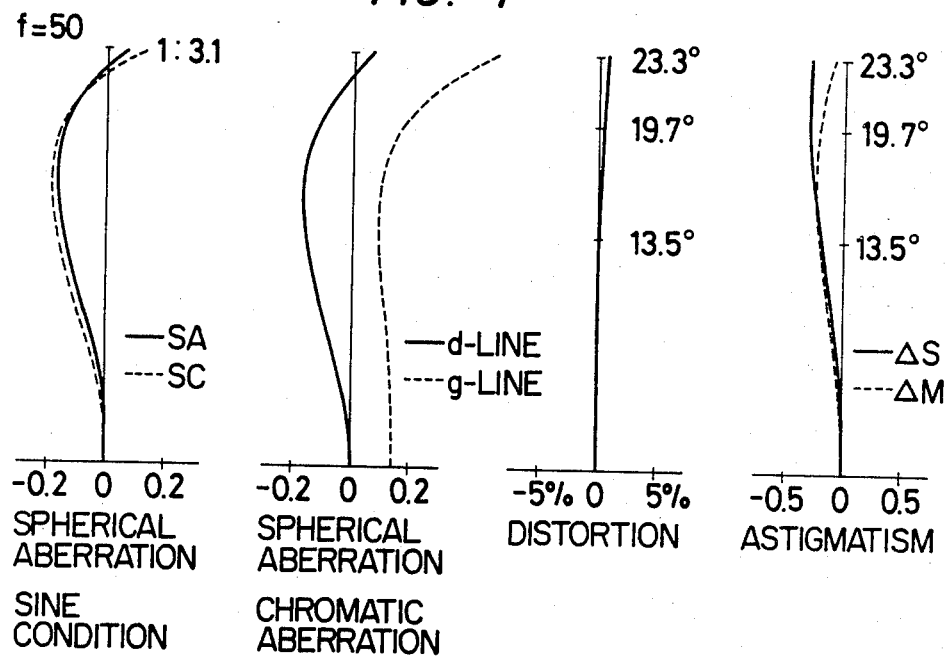
Figure 8:
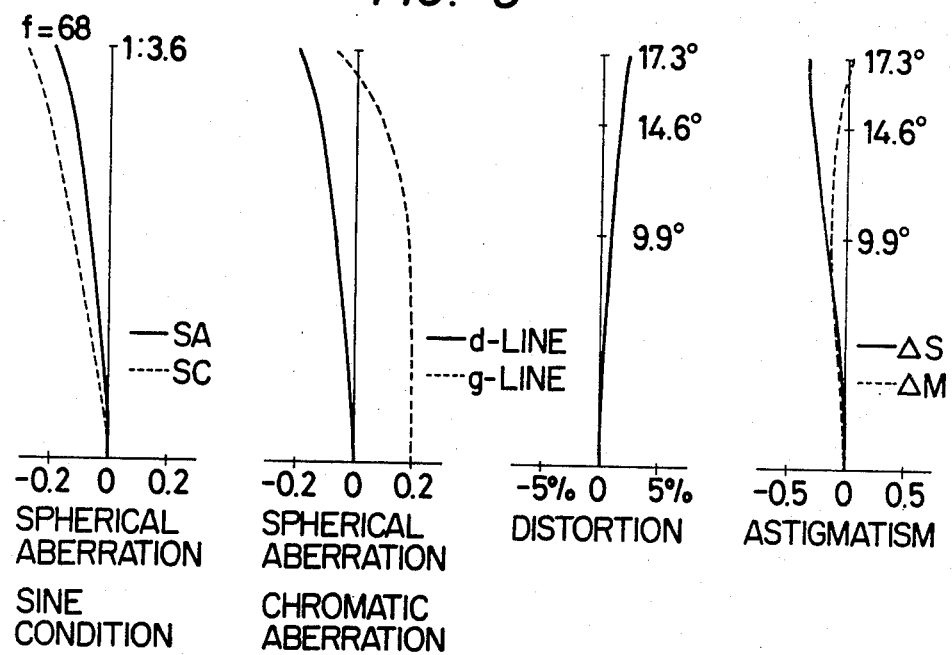

A second embodiment is presented with respect to the following table and FIGS. 5-8.

| SECOND EMBODIMENT Focal Length: F = 41.0 ~ 68.0 | | | |
|---|---|---|---|
| Radius of Curvature | Lens Thickness | Refractive Index | Abbe Number |
| $r_1$ = 238.573 | $d_1$ = 4.10 | $n_1$ = 1.46450 | $\nu_1$ = 66.0 |
| $r_2$ = −88.800 | $d_2$ = 0.68 | | |
| $r_3$ = −123.000 | $d_3$ = 1.30 | $n_2$ = 1.88300 | $\nu_2$ = 40.8 |
| $r_4$ = 27.832 | $d_4$ = 4.27 | | |
| $r_5$ = 33.881 | $d_5$ = 3.88 | $n_3$ = 1.84666 | $\nu_3$ = 23.9 |
| $r_6$ = 92.741 | $d_6$ = 30.46 ~ 3.17 (variable) | | |
| $r_7$ = 56.517 | $d_7$ = 2.71 | $n_4$ = 1.69680 | $\nu_4$ = 56.5 |
| $r_8$ = −445.920 | $d_8$ = 0.10 | | |
| $r_9$ = 19.465 | $d_9$ = 3.95 | $n_5$ = 1.64000 | $\nu_5$ = 60.1 |
| $r_{10}$ = 54.490 | $d_{10}$ = 0.10 | | |
| $r_{11}$ = 19.896 | $d_{11}$ = 1.81 | $n_6$ = 1.61800 | $\nu_6$ = 63.4 |
| $r_{12}$ = 24.750 | $d_{12}$ = 3.41 | | |
| $r_{13}$ = 45.992 | $d_{13}$ = 1.20 | $n_7$ = 1.84666 | $\nu_7$ = 23.9 |
| $r_{14}$ = 12.000 | $d_{14}$ = 1.57 | | |
| $r_{15}$ = 13.703 | $d_{15}$ = 4.80 | $n_8$ = 1.48749 | $\nu_8$ = 70.1 |
| $r_{16}$ = 16.331 | $d_{16}$ = 2.65 | | |
| $r_{17}$ = 37.468 | $d_{17}$ = 1.75 | $n_9$ = 1.84666 | $\nu_9$ = 23.9 |
| $r_{18}$ = 178.352 | | | |

$d_1 + d_2 + d_3 + d_4 + d_5 = 14.23$
$r_4/r_5 = 0.8215$

It is apparent that modifications of this invention are possible without departing from the essential scope of this invention.

What is claimed is:

1. A compact standard zoom lens comprising in order from the object side; a front divergent lens group and a rear convergent lens group, both lens groups being mechanically movable to thereby vary the focal length, said front divergent lens group composed, in order from the object side, of a first lens being a positive lens, a second lens being a double concave lens and a third lens being a positive meniscus lens convex on the object side, and said convergent lens group composed of four positive lenses and one negative lens, said zoom lens satisfying the following conditions:

| Focal Length: F = 41 ~ 58.2 | | | |
|---|---|---|---|
| Radius of Curvature | Lens Thickness | Refractive Index | Abbe Number |
| $r_1$ = 1430.844 | $d_1$ = 3.42 | $n_1$ = 1.68250 | $\nu_1$ = 44.7 |
| $r_2$ = −78.000 | $d_2$ = 0.18 | | |
| $r_3$ = −90.880 | $d_3$ = 1.46 | $n_2$ = 1.83481 | $\nu_2$ = 42.7 |
| $r_4$ = 27.915 | $d_4$ = 4.91 | | |
| $r_5$ = 33.881 | $d_5$ = 3.48 | $n_3$ = 1.69895 | $\nu_3$ = 30.1 |
| $r_6$ = 107.950 | $d_6$ = 21.78 ~ 1.33 (variable) | | |
| $r_7$ = 57.855 | $d_7$ = 3.23 | $n_4$ = 1.81600 | $\nu_4$ = 46.6 |
| $r_8$ = −212.500 | $d_8$ = 2.11 | | |
| $r_9$ = 23.205 | $d_9$ = 2.84 | $n_5$ = 1.81554 | $\nu_5$ = 44.4 |
| $r_{10}$ = 34.500 | $d_{10}$ = 0.10 | | |
| $r_{11}$ = 19.350 | $d_{11}$ = 3.54 | $n_6$ = 1.64000 | $\nu_6$ = 60.1 |
| $r_{12}$ = 38.667 | $d_{12}$ = 1.38 | | |
| $r_{13}$ = 60.350 | $d_{13}$ = 1.30 | $n_7$ = 1.84666 | $\nu_7$ = 23.9 |
| $r_{14}$ = 14.400 | $d_{14}$ = 8.84 | | |
| $r_{15}$ = −13639.246 | $d_{15}$ = 3.96 | $n_8$ = 1.88300 | $\nu_8$ = 40.8 |
| $r_{16}$ = −56.177 | | | |

2. A compact standard zoom lens comprising in order from the object side; a front divergent lens group and a rear convergent lens group, both lens groups being mechanically movable to thereby vary the focal length, said front divergent lens group composed, in order from the object side, of a first lens being a positive lens, a second lens being a double concave lens and a third lens being a positive meniscus lens convex on the object side, and said convergent lens group composed of five positive lenses and one negative lens, said zoom lens satisfying the following conditions:

| Focal Length: F = 41.0 ~ 68.0 | | | |
|---|---|---|---|
| Radius of Curvature | Lens Thickness | Refractive Index | Abbe Number |
| $r_1$ = 238.573 | $d_1$ = 4.10 | $n_1$ = 1.46450 | $\nu_1$ = 66.0 |
| $r_2$ = −88.800 | $d_2$ = 0.68 | | |
| $r_3$ = −123.000 | $d_3$ = 1.30 | $n_2$ = 1.88300 | $\nu_2$ = 40.8 |
| $r_4$ = 27.832 | $d_4$ = 4.27 | | |
| $r_5$ = 33.881 | $d_5$ = 3.88 | $n_3$ = 1.84666 | $\nu_3$ = 23.9 |
| $r_6$ = 92.741 | $d_6$ = 30.46 ~ 3.17 (variable) | | |
| $r_7$ = 56.517 | $d_7$ = 2.71 | $n_4$ = 1.69680 | $\nu_4$ = 56.5 |
| $r_8$ = −445.920 | $d_8$ = 0.10 | | |
| $r_9$ = 19.465 | $d_9$ = 3.95 | $n_5$ = 1.64000 | $\nu_5$ = 60.1 |
| $r_{10}$ = 54.490 | $d_{10}$ = 0.10 | | |
| $r_{11}$ = 19.896 | $d_{11}$ = 1.81 | $n_6$ = 1.61800 | $\nu_6$ = 63.4 |
| $r_{12}$ = 24.750 | $d_{12}$ = 3.41 | | |
| $r_{13}$ = 45.992 | $d_{13}$ = 1.20 | $n_7$ = 1.84666 | $\nu_7$ = 23.9 |
| $r_{14}$ = 12.000 | $d_{14}$ = 1.57 | | |
| $r_{15}$ = 13.703 | $d_{15}$ = 4.80 | $n_8$ = 1.48749 | $\nu_8$ = 70.1 |
| $r_{16}$ = 16.331 | $d_{16}$ = 2.65 | | |
| $r_{17}$ = 37.468 | $d_{17}$ = 1.75 | $n_9$ = 1.84666 | $\nu_9$ = 23.9 |
| $r_{18}$ = 178.352 | | | |

* * * * *